J. URBAN.
SHOVEL PLOW.
APPLICATION FILED JAN. 17, 1919.
1,331,296. Patented Feb. 17, 1920.
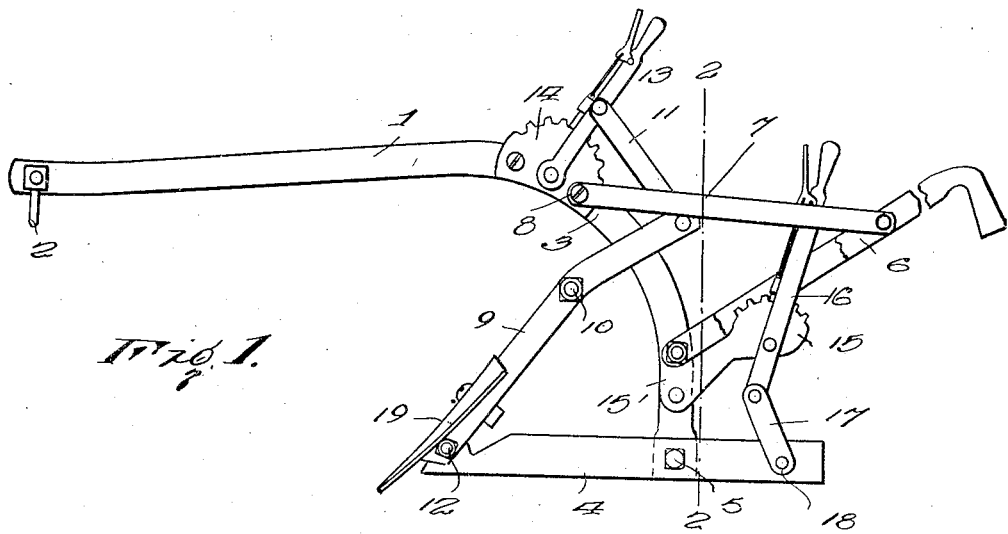
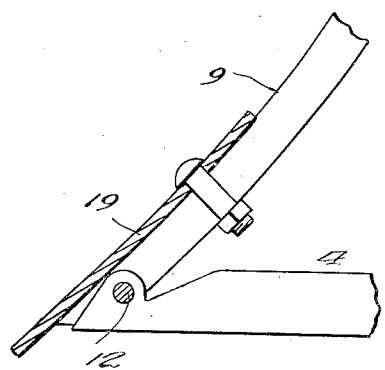
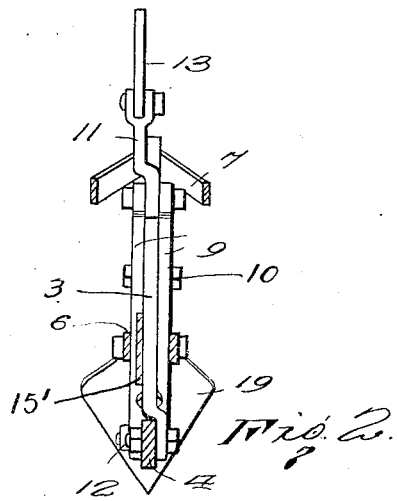
John Urban
Inventor
By Geo. P. Kimmel
Attorney

UNITED STATES PATENT OFFICE.

JOHN URBAN, OF CALDWELL, TEXAS.

SHOVEL-PLOW.

1,331,296.　　　　Specification of Letters Patent.　　Patented Feb. 17, 1920.

Application filed January 17, 1919. Serial No. 271,644.

*To all whom it may concern:*

Be it known that I, JOHN URBAN, a citizen of the United States, residing at Caldwell, in the county of Burleson and State of Texas, have invented certain new and useful Improvements in Shovel-Plows, of which the following is a specification.

This invention relates to improvements in cultivators and it is the principal object of the invention to provide a shovel plow capable of being adjusted to cause engagement of the earth working means with the earth at predetermined depths, thus, rendering the same especially desirable for use in cultivating soil differing in nature and qualities and soil in which crops requiring conditions peculiar thereto are to be planted.

The object of the invention more explicitly but functionally set forth is to provide a shovel plow having means for permitting adjustment of the runner with relation to the beam and additional means facilitating independent adjustment of the blade.

Other objects will be in part obvious and in part pointed out hereinafter.

The invention consists, furthermore, in the novel arrangements and combinations of parts of the cultivator, as well as in the details of the construction of the same, all of which will be more fully described in the following specification, and then finally embodied in the clauses of the claim, which are appended to this specification and which form an essential part of the same.

In the drawings:

Figure 1 is a side elevation of the improved shovel plow.

Fig. 2 is a vertical section therethrough taken on the line 2—2 of Fig. 1, and

Fig. 3 is a fragmentary vertical longitudinal section through the shovel or earth working element showing the mounting of the same.

Having more particular reference to the drawings, in connection with which like reference characters will designate corresponding parts throughout the several views, 1 represents the beam of the improved plow, the forward end of which is provided with a suitable form of clevis 2 while the rear end thereof is curved as at 3 and pivotally engaged with an earth slide or runner 4, which as will be noted, is disposed parallel to the beam 1, by means of a bolt 5, passing therethrough. Rearwardly diverging handles 6 are connected with the lower portion of the beam and as will be noted, are braced with relation to said beam by means of arms 7 engaged therewith and with the beam as indicated at 8.

Standards 9 are provided and as will be noted, have bolts designated by the numeral 10 passing through suitable spacing elements 9ª, being arranged upon the intermediate portions of said bolts for maintaining the standards in spaced relation. The upper portions of the standards 9 slidably embrace the curved portion 3 of the beam and are pivotally connected to one end of a link 11, while the lower ends of the same embrace and are pivotally connected to the forward portion of the runner 4 as at 12. The opposite end of the link 11 is engaged in a suitable manner with an adjusting lever 13 pivotally mounted on the beam and carrying the usual slidable locking pawl adapted for engagement with the toothed segments 14 also secured in a suitable manner to the adjacent portion of said beam.

A second toothed segment 15 provided with a forwardly directed bracket portion 15′ is provided, said bracket portion being secured to the lower curved portion 3 of the beam by rivets or similar fastening devices. Pivotally mounted on the toothed segment 15 is an operating lever 16 carrying a slidable pawl engageable with said segment and having a link 17 pivotally engaged with the lower extremity thereof, which link as will be noted, is also pivotally connected to the rear extremity of the runner 4 as at 18.

Secured to the lower portions of the standards 9 is a suitable earth working element or shovel 19, which as will be understood, is engaged with the earth or soil during operation of the plow and of course, serves to cultivate the same.

In operation, to effect relative adjustment between the beam and earth working element of the plow, the operating lever 16 is rocked to the desired extent and is then locked in its adjusted position by reason of the engagement of the slidable pawl with the adjacent toothed portion of the segment 15. However, should adjustment between the earth working element and the beam 1 be desired, the operating lever 13 is now rocked, thus causing pivotal movement of the standards 9 and the shovel 19 on the pivot 12. Hence, when said operating lever is locked in its adjusted position, the shovel will be caused to move to a predetermined depth with relation to the soil being cultivated thereby when the cultivator is drawn thereover. By this mode of adjustment, it will be readily appreciated by persons skilled in the art that I am enabled to cultivate soil to varying depths, according to the nature of the crop to be planted therein; it of course being understood, that various crops require certain conditions peculiar thereto and as a consequence, the soil must necessarily be cultivated to the proper depth. Further, it will be also appreciated that the shovel plow may be used for turning up soil previous to the planting of a crop in order that previous growths will be effectually dislodged therefrom and in this way, effectually clear the land or soil, thus, promoting the growth of the crop when planted.

Manifestly, the construction shown is capable of considerable modification and such modification as is within the scope of my claim, I consider within the spirit of my invention.

I claim:

In combination with the beam of a plow, a longitudinally disposed runner pivotally mounted intermediate its ends to the plow beam, an adjusting lever pivotally connected with the plow beam, a link connection between the lower terminal of the lever and the rear extremity of the runner for varying the angularity of the latter with relation to the plow beam, a standard pivotally connected with the forward terminal of the runner, an earth working element supported by the standard movable angularly with relation to the runner and beam, an adjusting lever pivotally supported upon the plow beam in spaced relation to the first mentioned adjusting lever, and a link connecting the standard with the second mentioned lever.

In testimony whereof I affix my signature hereto.

JOHN URBAN.